United States Patent
White

(10) Patent No.: US 8,573,409 B2
(45) Date of Patent: Nov. 5, 2013

(54) HORIZONTAL CABLE TRAY REDIRECTOR

(75) Inventor: Thomas C White, Greenville, SC (US)

(73) Assignee: James C. White Co., Inc., Greenville, SC (US)

( * ) Notice: Subject to any disclaimer, the term of this patent is extended or adjusted under 35 U.S.C. 154(b) by 294 days.

(21) Appl. No.: 13/159,259

(22) Filed: Jun. 13, 2011

(65) Prior Publication Data

US 2012/0312761 A1 Dec. 13, 2012

(51) Int. Cl.
*A47F 7/00* (2006.01)
(52) U.S. Cl.
USPC .............................. 211/13.1; 108/64; 248/65
(58) Field of Classification Search
USPC ................. 211/13.1; 108/64, 50.01, 50.02; 312/223.6; 248/49, 65, 70, 73; 403/205, 202
See application file for complete search history.

(56) References Cited

U.S. PATENT DOCUMENTS

| | | | | |
|---|---|---|---|---|
| 923,721 | A * | 6/1909 | Smith | 108/92 |
| 1,375,794 | A * | 4/1921 | McSheehy | 206/425 |
| 3,137,468 | A | 6/1964 | Meinders | |
| 3,784,021 | A * | 1/1974 | Mark | 108/64 |
| 4,232,845 | A | 11/1980 | Turner | |
| 4,432,519 | A | 2/1984 | Wright | |
| 4,840,023 | A | 6/1989 | Borsani | |
| 6,143,984 | A * | 11/2000 | Auteri | 174/68.3 |
| 6,325,337 | B1 | 12/2001 | Pedley et al. | |
| 6,498,296 | B2 | 12/2002 | Benito-Navazo | |
| 6,637,704 | B2 | 10/2003 | Jette | |
| 7,073,299 | B1 | 7/2006 | diGirolama et al. | |
| 7,542,650 | B2 * | 6/2009 | Ellison et al. | 248/49 |
| 7,815,152 | B2 * | 10/2010 | Beck | 248/65 |
| 8,251,321 | B2 * | 8/2012 | Chen et al. | 248/70 |
| 8,387,933 | B2 * | 3/2013 | Yu et al. | 248/220.22 |
| 2002/0006312 | A1* | 1/2002 | Buard | 403/403 |
| 2005/0111909 | A1* | 5/2005 | Mathieu et al. | 403/205 |
| 2009/0084910 | A1* | 4/2009 | White | 248/70 |
| 2010/0133390 | A1* | 6/2010 | Lange et al. | 248/65 |
| 2010/0224737 | A1* | 9/2010 | LaFontaine et al. | 248/70 |

OTHER PUBLICATIONS

Tube Track 2005 Catalog, James C. White Co., Inc., Copyright 2004, pp. 12-13.

* cited by examiner

*Primary Examiner* — Jose V Chen
(74) *Attorney, Agent, or Firm* — Timothy D. St. Clair; Nexsen Pruet, LLC

(57) ABSTRACT

A cable tray connector that allows for the adjustment of cable trays attached thereto to permit adjustable, angular redirection of the cable tray path within a horizontal plane. Such connector comprises a bed having cable tray attachment zones, where the respective cable trays may be attached; side walls positioned around portions of the bed; and, optionally, a cable guide disposed centrally within the bed. Each cable tray attachment zone may include a first, circular aperture for pivotal attachment of a cable tray and at least one arcuate slotted aperture for adjustable attachment of the same cable tray.

20 Claims, 7 Drawing Sheets

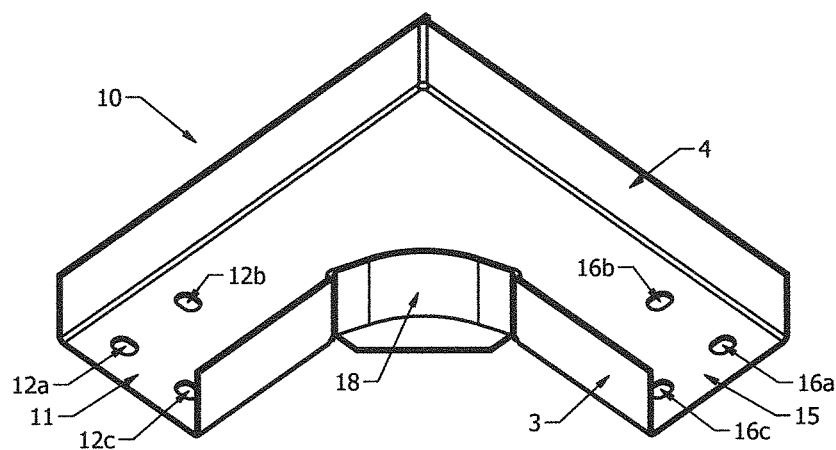
- FIG. 1 -
PRIOR ART
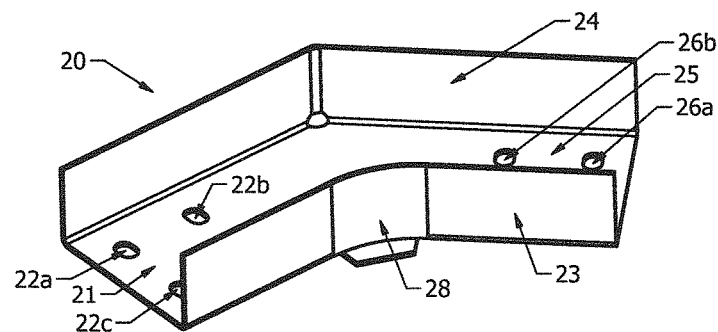
- FIG. 2 -
PRIOR ART

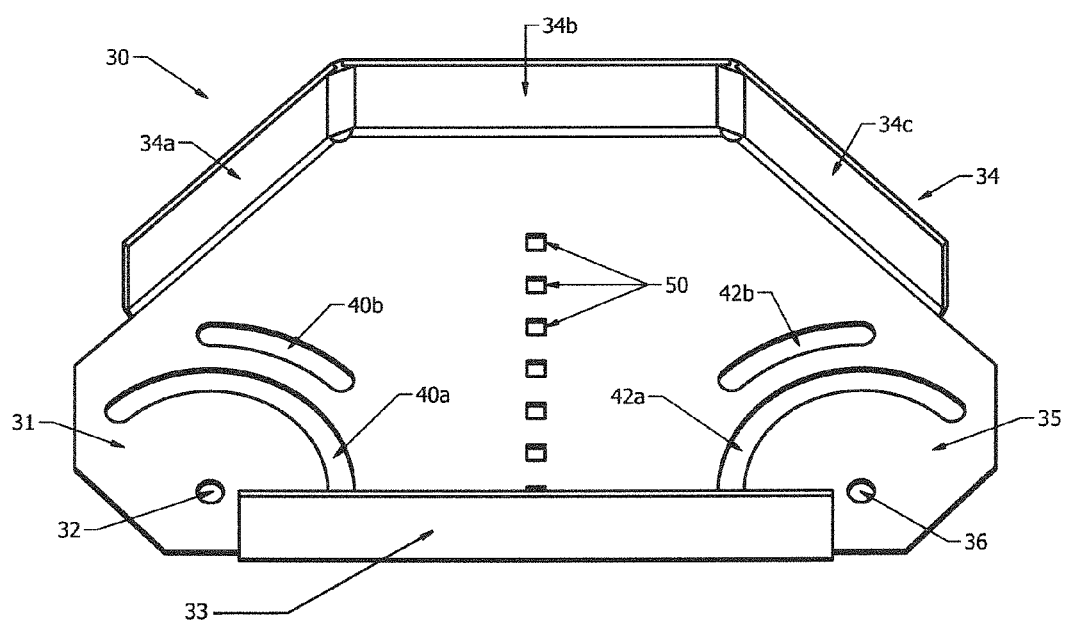
- FIG. 3A -

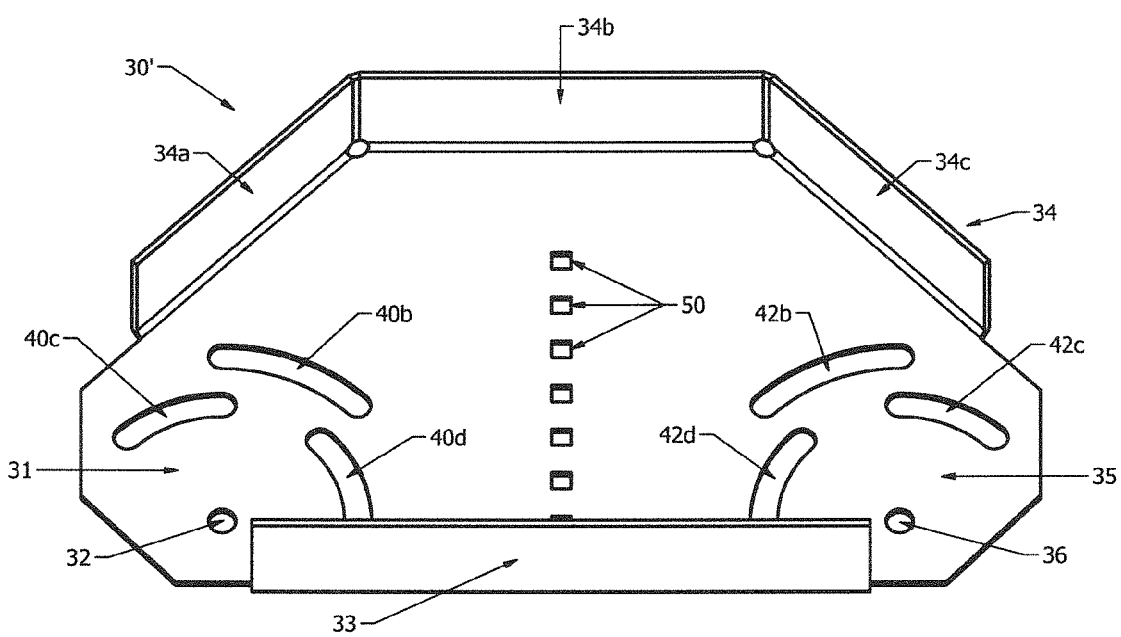
- FIG. 3B -

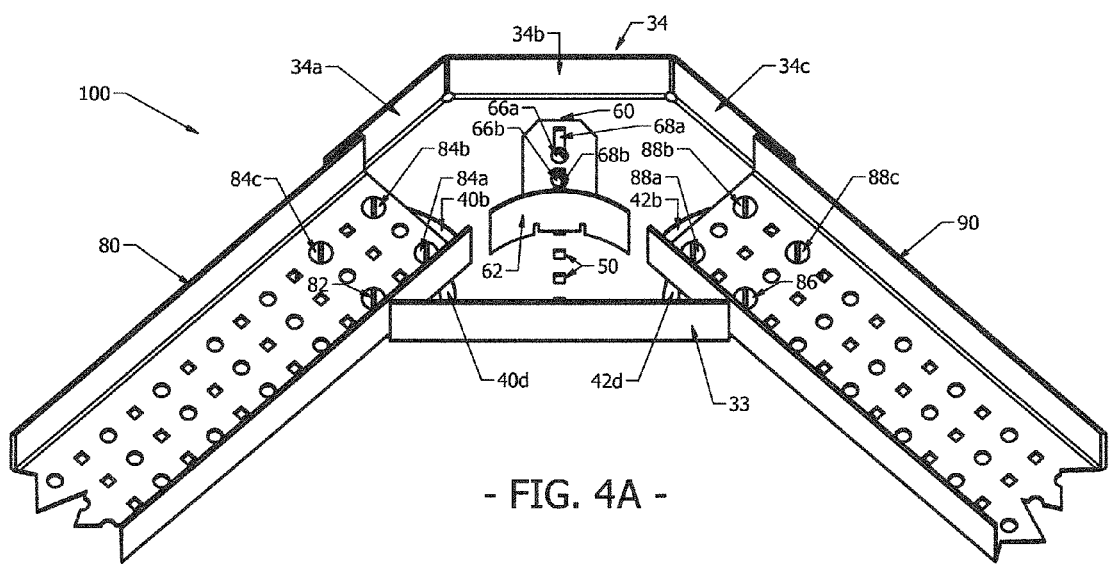
- FIG. 4A -

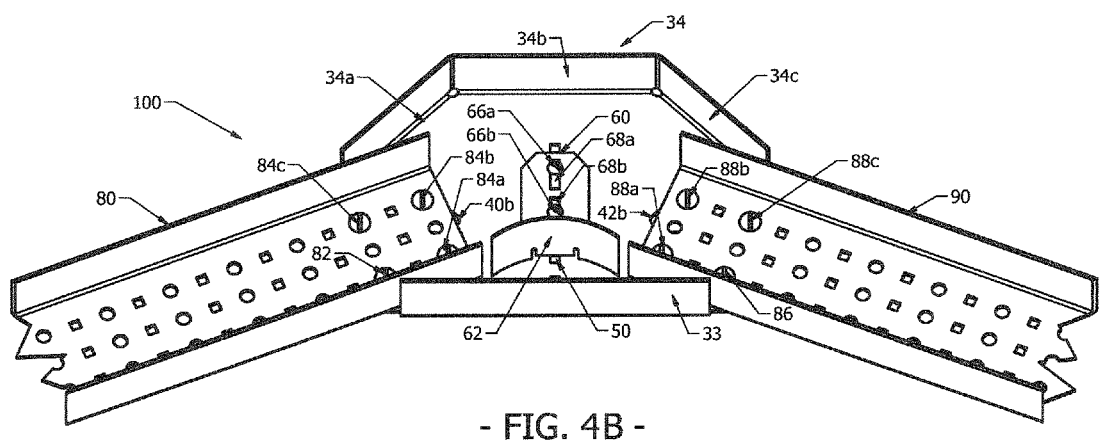
- FIG. 4B -

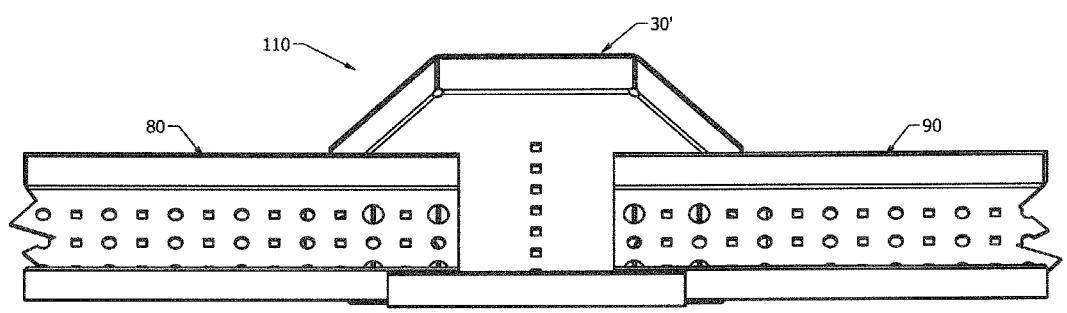
- FIG. 5 -

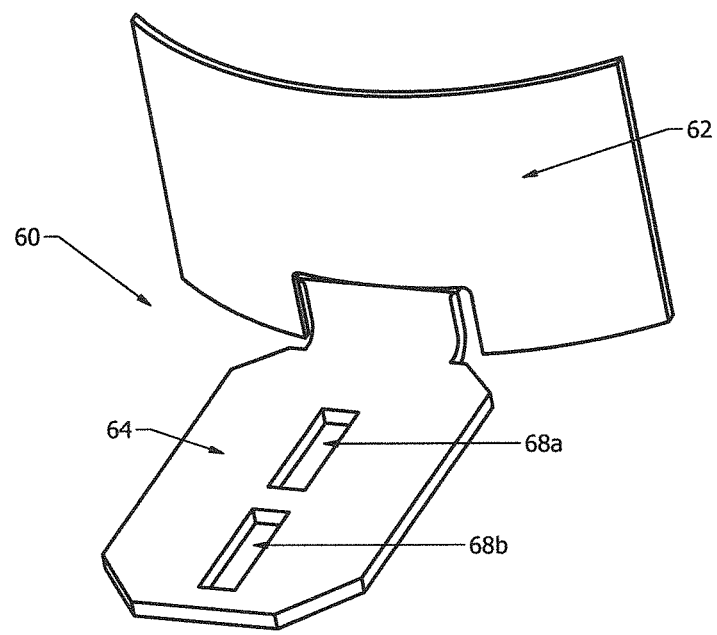
- FIG. 6 -

HORIZONTAL CABLE TRAY REDIRECTOR

TECHNICAL FIELD

Provided herein is a connection member, or redirector, for cable tray systems. More particularly, the connection member is a planar bed for horizontally adjustable attachment of two cable trays along the plane of the bed.

BACKGROUND

Cable tray systems are used to support, fasten, and manage lengths of cables, tubes, pipe, conduits, and wires. Cable tray systems may be used in commercial and industrial facilities, power generation facilities, manufacturing plants, and the like. Cable tray systems may include components such as cable trays, connector pieces, and brackets, which are secured to one another by fasteners (e.g., bolts, nuts, or other fasteners). The cable trays used in these systems often have a U-shaped or L-shaped cross-section, with the cables, tubes, pipe, conduits, and/or wires being carried within the U-shape or L-shape and being fixed to or guided within the cable trays.

In some applications, the primary requirement for a completed cable tray system is structural rigidity. For other applications, the completed system is preferably devised to minimize or eliminate electrical arcing between connected members of the system by maintaining conductive continuity in the event that the system becomes electrically energized.

Cable tray systems typically are constructed of linear runs of trays connected together to span the required length of a given application. Separate sections of trays are fastened together to achieve the requisite length. Some applications may allow an entire cable tray run to be installed in a straight line without interruption. Often, previously installed features, such as pipes, conduits, ductwork, or even other cable tray runs, are obstacles to the installation of a linear cable tray run, requiring the new cable tray run to be horizontally redirected from its original path. In some circumstances, it may be desirable to redirect the path of a cable tray from one direction to another within a single horizontal plane, perhaps multiple times along its length, to accommodate the requirements of the particular application.

The extent to which the course of a cable tray run must be redirected may vary widely, depending on the individual site. Often, the degree of redirection that may be necessary is difficult to predict at the beginning of the installation process without extensive and, in view of the present invention, unnecessary planning, making it equally difficult to arrive on-site with sufficient hardware to complete the installation. Accordingly, it would be advantageous to have connectors that permit the adjustable redirection of a cable tray run, rather than connectors with fixed geometry or that require custom fitting or fabrication on-site.

A first method of redirecting a cable tray run has been to use rigid, non-adjustable interconnectors of fixed angle of redirection (e.g., 30°, 45°, 60° 90°, etc.) in the run, to avoid obstructing interferences or to change direction as otherwise required. Prior devices used to achieve that result are shown in FIGS. 1 and 2. Specifically, use of device 10 depicted in FIG. 1 provides for ninety degrees (90°) of course redirection to a cable tray run. In use, a first section of cable tray (not shown) may be fastened to a first cable tray attachment zone 11 of device 10, fitting connecting bolts (not shown) through holes 12a-c. A second section of cable tray (not shown) may be fastened to cable tray attachment zone 15 of device 10, fitting additional connecting bolts (not shown) through holes 16a-c. So interconnected, device 10 provides only a rigid, non-adjustable 90° angle of redirection to a cable tray run.

Similarly, use of device 20 depicted in FIG. 2 provides for a 45° angle of course redirection to a cable tray run. A first section of cable tray (not shown) may be fastened to a first cable tray attachment zone 21 of device 20, fitting connecting bolts (not shown) through holes 22a-c. A second section of cable tray (not shown) may be fastened to a second cable tray attachment zone 25 of device 20, fitting additional connecting bolts (not shown) through holes 26a-b. So interconnected, device 20 provides only a rigid, non-adjustable 45° angle of redirection to a cable tray run.

Clearly, however, use of either device 10 or device 20 would provide only two choices of cable tray course redirection—either 45° or 90°—and would offer no adjustability of the redirection to fit site-specific requirements.

Another method of accomplishing such redirection has been to require the installer to cut, fit, and attach custom-fabricated members in the field to work around an obstacle. Such work has been suffered as labor intensive, time consuming, costly, and undesirable. In addition, such an approach does not provide for adjustability of the redirection of the cable trays.

Another method of redirecting a cable tray run may be found in U.S. Pat. No. 4,232,845, which is directed toward a modular support system constructed from a plurality of transportable modular components for assembly into shelves, platforms, ladders, walkways, and other similar structures. The disclosed apparatus provides for redirection of a cable track course. However, the apparatus accomplishes such redirection through the use of non-adjustable members, such as component 222. No adjustability between connected sections of a cable track, and therefore no adjustable range of angular relationships within a run of cable track, may be accomplished.

Yet another method of redirecting a cable tray run may be found in U.S. Pat. No. 3,137,468. While such an apparatus may result in a cable track with sections redirected, such redirection is accomplished by use of a form section of cable track. No provision is made for adjustability between connected sections of a cable track and, therefore, no range of angular relationships within a run of cable track can be accomplished.

U.S. Pat. No. 4,432,519 may describe a cable mounting ladder for installation to a building or other structure constructed so that curved sections can be interconnected to avoid obstructions. The apparatus may accomplish such avoidance only with the use of pre-fabricated, fixed geometry, angled interconnectors between adjacent tray members, resulting in a labor-intensive, cumbersome system. Furthermore, such a device provides no adjustability between interconnected sections of cable track.

Finally, U.S. Pat. No. 6,498,296 may describe a cable track system to allow for redirection of the cable tray course. Accomplishing such redirection with this patented system, though, requires the use of rigid, pre-fabricated joining members, and, therefore, suffers the same disadvantages as described above, including the absence of any opportunity to adjust the angle between interconnected sections of cable track.

SUMMARY

In view of the many advantages of cable tray systems in general and in recognition of the specific need to avoid interfering obstacles and conveniently redirecting the direction of a cable tray at a desired angle by including an adjustable redirector in constructing such systems, the present disclosure is directed to a cable tray connector that provides for the adjustable angular redirection, along the horizontal plane of the connector, of a cable tray run.

Accordingly, a cable tray redirector is provided that allows for the horizontal adjustment of cable trays attached thereto to permit adjustable angular redirection of the cable tray path within a single horizontal plane. Such redirector comprises a planar bed having cable tray attachment zones, to which respective cable trays may be attached; side walls positioned around portions of the bed that define the cable tray attachment zones; and, optionally, a cable guide disposed centrally within the bed that may establish a minimum bending radius for materials disposed within the adjustable redirector.

Each cable tray attachment zone may include a first aperture for pivotal attachment of a cable tray and at least one aperture for adjustable attachment of the same cable tray. The first aperture, which may be circular, is sized to receive a tightenable fastener, such as a bolt. The first aperture may maintain the relative position between the features of the redirecting connector and a cable tray throughout adjustment. The remaining aperture(s) preferably define an arcuate, or curvilinear, length and, more preferably, define an arcuate slot having continuous, smooth sides.

A cable tray may be attached to the connector by inserting a first bolt through an aperture in the cable tray and the first aperture of the connector and then inserting a second bolt through another aperture in the cable tray and a second aperture, which may be a curvilinear slot). Before tightening the bolts, if necessary, the cable tray may be pivoted upon the cable tray attachment zone, using the first bolt in the first aperture as a pivot point, until the cable tray is adjusted to the desired angular placement. Once such position is realized, the bolts may be tightened to fix the chosen arrangement. The process may then be repeated for a second cable tray, which may be independently positioned to its own desired orientation.

In a first embodiment, illustrated in FIG. 3A, a pair of arcuate slots (second and third apertures) are provided in each cable tray attachment zone for the adjustment of each cable tray. Relative to the first aperture mentioned above, one of the slots forms an arcuate path having a smaller radius than that of the arcuate path formed by the other slot. The pivot hole and two slots may accommodate four fasteners required for each cable tray attachment zone.

In an alternate embodiment, illustrated in FIG. 3B, a set of three slots (second, third, and fourth apertures) are provided in each cable tray attachment zone for the adjustment of each cable tray. Relative to the first aperture mentioned.

An optional cable guide may also be used in conjunction with the present cable tray redirectors. The cable guide may comprise a cable guide flange, of a predetermined radius, integrated with a base member. The cable guide may be attached to the bed of the connector using bolts that are disposed through the base member and two of the apertures provided in the center portion of the connector bed for such purpose. Either the apertures in the base member of the cable guide or apertures in the center portion of the connector bed may be slotted to facilitate continuous adjustment for positioning of the cable guide relative to the position of the cable tray components.

BRIEF DESCRIPTION OF THE DRAWINGS

FIG. 1 is a perspective view of a cable tray connector of the prior art for redirecting the course of a cable tray run by ninety degrees;

FIG. 2 is a perspective view of another cable tray connector of the prior art for redirecting the course of a cable tray run by forty-five degrees;

FIG. 3A is an isometric view of a first embodiment of the present cable tray connector, having two arcuate slots for horizontal adjustment of each cable tray within a given horizontal plane;

FIG. 3B is an isometric view of a second embodiment of the present cable tray connector, having three arcuate slots for horizontal adjustment of each cable tray within a given horizontal plane;

FIG. 4A is an isometric view of the cable tray connector of FIG. 3B, to which two cable trays have been attached at a 90° angle of redirection and to which a centrally located, repositionable cable guide is also attached;

FIG. 4B is an isometric view of the cable tray connector of FIG. 3B, to which two cable trays have been attached @ a 45° angle of redirection and to which a centrally located, repositionable cable guide is also attached;

FIG. 5 is an isometric view of the cable tray connector of FIG. 3B, to which two cable trays have been attached in opposed configuration; and FIG. 6 is an isometric view of the repositionable cable guide shown in FIGS. 4A and 4B.

DETAILED DESCRIPTION

Reference will now be made in detail to presently preferred embodiments of the present subject matter, one or more examples of which are illustrated in the drawings.

FIG. 1 is a perspective view of a commonly used cable tray connector 10. Connector 10 has a bed defined between a first wall 3 and a second wall 4, wall 4 being formed at a 90-degree angle. Along the bed of connector 10 and at opposite ends are a first cable tray attachment zone 11 having four apertures 12a, 12b, 12c (the fourth not shown at such perspective) and a second cable tray attachment zone 15 having four apertures 16a, 16b, 16c (the fourth not shown at such perspective).

In use, a first cable tray (not shown) may be bolted to the first cable tray attachment zone 11 by fitting correspondingly sized bolts through apertures 12a, 12b, 12c, and the fourth aperture not shown. Similarly, a second cable tray (not shown) may be bolted to the second cable tray attachment zone 15 by fitting correspondingly sized bolts through apertures 16a, 16b, 16c, and the fourth aperture not shown. Thus, the run of the cable tray course may be redirected 90 degrees, but no more or less, nor is the angle of the redirection adjustable. A flange 18 is provided along wall 3 to guide cables, conduits, wires, or pipes through connector 10 and to prevent damage thereto and may maintain a minimum bending radius.

FIG. 2 is a perspective view of yet another cable tray connector 20. Connector 20 has a bed defined between a first wall 23 and a second wall 24, wall 24 being formed to orient the cable tray run at a 45-degree angle. Along the bed of connector 20 and at opposite ends are a first cable tray attachment zone 21 having four apertures 22a, 22b, 22c (the fourth not shown) and a second cable tray attachment zone 25 having four apertures 26a, 26b (the third and fourth not shown).

In use, a first cable tray (not shown) may be bolted to the first cable tray attachment zone 21 by fitting bolts through apertures 22a, 22b, 22c, and the fourth aperture not shown. Similarly, a second cable tray (not shown) may be bolted to the second cable tray attachment zone 25 by fitting bolts through apertures 26a, 26b, the third and fourth apertures not shown. Thus, the run of the cable tray course is redirected 45 degrees, but no more or less, nor is the angle of the redirection adjustable. A flange 28 is provided along wall 23 to guide cables, conduits, wires, or pipes through connector 20 and to prevent damage thereto and may maintain a minimum bending radius.

FIGS. 1 and 2 illustrate systems in which a pair of cable trays may be attached to a connector by positioning tightenable fasteners through the cable trays and through the corresponding apertures in the connector beds. As a result, the cable tray systems exhibit a high degree of surface area contact between the cable trays and the connector (that is, the end of the cable tray firmly contacts the cable attachment zone of the connector bed by using tightenable fasteners for secure contact). Advantageously, therefore, the likelihood of electrical arcing, which might occur in the event of inadvertent electrification of the system, is significantly minimized.

Unfortunately, the use of fixed-angle connectors (like those shown in FIGS. 1 and 2) has caused unfortunate constraints with the installation of cable tray runs when it becomes necessary to adjust the direction of a particular cable tray to avoid previously installed objects. Because the cable tray is necessarily connected at multiple fixed points, the positioning of the cable tray is likewise fixed. As a result, the ability to maneuver around obstacles is hindered or is dictated by fixed prior art geometries. In addition, the cable tray installer must have on-hand a large number of fixed-angle connectors of various angles, in anticipation of the number and shape of impediments that may be encountered during a given installation.

FIG. 3A is an isometric view of an embodiment of a present cable tray connector 30, having two arcuate slots 40a, 40b for adjustment of a pair of cable trays (not shown). Connector 30 includes a bed defined between a first wall 33 and a second wall 34, walls 33 and 34 extending from portions of the perimeter of the connector bed perpendicularly to the plane of the bed. Wall 34 includes a central portion 34b that may be parallel to wall 33 and that is surrounded by angularly disposed portions 34a and 34c. Optionally, central portion 34b may be omitted. Wall segments 34a and 34c are oriented on a bias relative to first wall 33, but are sloped in opposite directions. Specifically, wall 33 and wall 34a may encompass therebetween a predetermined acute angle. The angle created by wall 33 and wall 34c (for example, if such walls were extended) may be supplementary to a predetermined acute angle. Preferably, the predetermined acute angle is approximately a 45-degree angle and the supplementary angle is approximately a 135-degree angle.

A first cable tray attachment zone 31—which is located on the bed of connector 30 disposed between wall 33 and wall 34a—includes an aperture 32 and a pair of arcuate apertures 40a, 40b. Similarly, a second cable tray attachment zone 35—which is located on the opposite end of the bed of connector 30 disposed between wall 33 and wall 34c—includes an aperture 36 and a pair of arcuate apertures 42a, 42b. Although two arcuate apertures are shown, it is contemplated that a single arcuate aperture, used in conjunction with a pivot aperture, may be effectively employed for each cable tray attachment zone.

A spaced row of apertures 50 may be positioned along a transverse axis of the connector bed, centrally located between the first cable tray attachment zone 31 and the second cable tray attachment zone 35. Preferably, although not required, the apertures 50 are square-shaped apertures and are sized and adapted to engage the square-shaped aspect of a carriage bolt head. A cable guide 60 (shown in FIGS. 4 and 6) may be attached to the connector bed by inserting bolts through at least a pair of these apertures 50.

Cable trays may be secured to connector 30 by inserting a tightenable fastener, such as a bolt, through an aperture in the bed of the cable tray and through aperture 32 (or 36), and then repeating the process by inserting bolts through other apertures in the cable tray and through corresponding slotted apertures 40a, 40b (or 42a, 42b). Because apertures 40a, 40b, 42a, 42b are arcuate slots rather than circular holes, the angle of each cable tray relative to the connector 30 may be adjusted, as needs dictate, to permit redirection of the cable tray run around an impediment or to redirect the tray for other desirable purposes. An advantage of the present connector is that each cable tray may be independently positioned relative to connector 30 and that, although preferred, it is not required for each cable tray to be positioned at the same angle.

FIG. 3B is an isometric view of a second embodiment of the present cable tray connector 30', having three arcuate slots 40b, 40c, and 40d for adjustment of each cable tray (not shown). Connector 30' may have the same shape, walls, and centrally located, square-shaped apertures 50 as connector 30.

A first cable tray attachment zone 31 may be located on the bed of connector 30' between wall 33 and wall 34a and may include a circular aperture 32 and three arcuate apertures 40b, 40c, and 40d. Similarly, a second cable tray attachment zone 35 may be located on the opposite end of the bed of connector 30' between wall 33 and wall 34c and may include a circular aperture 36 and three arcuate apertures 42b, 42c, and 42d.

Cable trays may be connected to connector 30' in the same manner used for connector 30—that is, by inserting a tightenable fastener, such as a bolt, through an aperture in the bed of the cable tray and through aperture 32 (or 36), and then repeating the process by inserting bolts through other apertures in the cable tray and through corresponding slotted apertures 40b, 40c, 40d (or 42b, 42c, 42d). Because apertures 40b, 40c, 40d, and 42b, 42c, and 42d are arcuate slots rather than circular holes, the angle of the cable tray may be adjusted, as described above, to permit redirection of the cable tray run around an impediment or to redirect the tray for other advantageous reasons.

FIG. 4A illustrates a cable tray system 100 having connector 30' to which two cable trays 80, 90 have been attached and to which a centrally located, repositionable cable guide 60 is also attached. As described above, cable tray 80 may be positioned over the first cable tray attachment zone and may be secured to connector 30' by bolts 82 (through aperture 32, not shown), 84a (through arcuate aperture 40d), 84b (through arcuate aperture 40b), and 84c (through arcuate aperture 40c, not shown).

On the opposite end of connector 30', cable tray 90 may be positioned over the second cable tray attachment zone and may be secured to connector 30' by bolts 86 (through aperture 36, not shown), 88a (through arcuate aperture 42d), 88b (through arcuate aperture 42b), and 88c (through arcuate aperture 42c, not shown). Bolts 82, 84a, 84b, 84c, 86, 88a, 88b, 88c are secured by fitted nuts, not shown. In this configuration, cable trays 80, 90 may be positioned to form a 90-degree angle, with the walls of each cable tray being in contact with the walls of the connector 30'.

To prevent cables, wires, tubes, and the like from being damaged during installation, to maintain a minimum inside bending radius, and to facilitate the smooth redirection of such cables, wires or tubes, a cable guide 60 may be attached to the central area of the bed of the connector. Cable guide 60 may include a flange portion 62 about which cables may be positioned, the flange portion 62 being integrated with a base portion 64. The base portion 64 includes a pair of slot-shaped apertures 68a, 68b therethrough. Carriage bolts 66a, 66b are positioned through apertures 68a, 68b, respectively, and through apertures 50 to secure cable guide 60 to connector

30'. To facilitate installation of cable guide 60, apertures 50 may be sized to accommodate the square-shaped portions beneath the heads of the carriage bolts.

FIG. 4B illustrates the cable tray system 100 of FIG. 4A with which the two cable trays 80, 90 have been reoriented to form an angle of approximately 135 degrees. Such reorientation illustrates an advantage of the present invention, in that it may be achieved simply by loosening bolts 82, 84*a*, 84*b*, 84*c*, 86, 88*a*, 88*b*, 88*c*, rotating cable trays 80, 90, then tightening said bolts once the preferred angle has been achieved.

FIG. 5 illustrates another configuration of connector 30' and two cable trays 80, 90, in which cable trays 80, 90 may be positioned directly across from one another to form a cable tray system 110 (that is, cable tray 80 and cable tray 90 define, between them, a 0-degree angle of redirection). In this configuration, connector 30' may act as a continuation of cable trays 80, 90, rather than as a device for redirecting the paths of one or more of cable trays 80, 90. Understandably, cable guide 60 may be unnecessary, when cable trays 80, 90 are oriented to form a straight path, and, thus, cable guide 60 is omitted from cable tray system 110.

It has been found that the large area of contact between the cable trays and the connector (as shown in both FIG. 4 and FIG. 5), along with the snugness of the contact achieved by tightening of the aforementioned bolts, minimizes or eliminates the risk of electrical arcing between the respective components of the cable tray system, in the event that the cable tray system should become electrically energized.

Because the apertures used for attachment of the cable trays are curvilinear slots defining an arc around a pivot aperture, the cable trays may be adjusted to any of a wide range of angles to facilitate cable tray installation.

Further, the cable trays may be loosely positioned by inserting but not fully tightening the bolts through the apertures, before finally positioning the cable trays and tightening the bolts to achieve a selected orientation. Angles ranging from 0-degrees to 90-degrees of redirection are readily achievable using the present connectors, which represents a significant improvement over conventional connectors. Not only is installation easier, but the need for multiple fixed-angle pieces is virtually eliminated through the use of a single connector that provides for a range of angular adjustment in a horizontal plane.

While curvilinear slots having continuous, smooth sides have been described and are shown, a slot having indexed notches may instead be used for one or more of the arcuate slots. Alternately, a series of circular apertures arranged in a curvilinear path may be used in place of a continuous arcuate slot. Regardless of the type of slot employed, tightenable fasteners, such as bolts, may be used to secure the cable tray to the cable tray attachment zone. Where the slot includes indexed notches, a shouldered bolt sized to interfit with the indexing notches may be used.

Finally, FIG. 6 illustrates repositionable cable guide 60, shown previously in FIGS. 4A and 4B. As described above, cable guide 60 may include a flange portion 62 about which cables may travel. The flange portion 62 may be integrated with a base portion 64 having two slot-shaped apertures 68*a*, 68*b* therethrough for receipt of correspondingly sized bolts. The slot-shaped apertures 68*a*, 68*b* make for easier installation and positioning of cable guide 60. Optionally, two bolts may be positioned through a single slot-shaped aperture, if desired.

So configured, the present invention provides a securable, 0-90-degree adjustable fitting. It maintains a walled configuration throughout the adjustment and requires no additional components.

The present description is intended to encompass all changes and modifications as fall within the scope of the appended claims and their equivalents. Thus, while exemplary embodiments have been shown and described, those skilled in the art will recognize that changes and modifications may be made to the foregoing examples without departing from the spirit and scope of the disclosure.

I claim:

1. A cable tray connector, said connector comprising:
    a bed, said bed defining a first cable tray attachment zone and a second cable tray attachment zone, said first cable tray attachment zone configured for receipt of a first cable tray and said second cable tray attachment zone configured for receipt of a second cable tray;
    said first cable tray attachment zone including first and second apertures through said bed, said first and second apertures each adapted to receive therethrough a fastener, at least one of said apertures defining a curvilinear length, whereby said fastener passed through said first cable tray and disposed within said aperture moves along said curvilinear length as said first cable tray is moved relative to said first cable tray attachment zone;
    wherein said bed further comprises a plurality of walls extending perpendicularly from portions of the perimeter of said bed,
    a first wall extending along a length of said bed, a second wall extending along said bed and being angularly disposed to said first wall in a first direction, and a third wall extending along said bed and being angularly disposed to said first wall in a second direction opposite to the first direction,
    wherein said second wall is disposed from said first wall at a predetermined acute angle and wherein said third wall is disposed from said first wall at an angle supplementary to said predetermined acute angle.

2. The cable tray connector of claim 1, wherein said curvilinear path defines an arc.

3. The cable tray connector of claim 1, wherein said predetermined acute angle is 45 degrees.

4. The cable tray connector of claim 1, wherein said first cable tray attachment zone is disposed between said first and second walls.

5. The cable tray connector of claim 1, wherein said second cable tray attachment zone is disposed between said first and third walls.

6. An adjustable cable tray course redirector, said course redirector comprising:
    a bed, said bed defining a first cable tray attachment zone and a second cable tray attachment zone, said first cable tray attachment zone configured for receipt of a first cable tray and said second cable tray attachment zone configured for receipt of a second cable tray;
    said first cable tray attachment zone including first and second apertures through said bed, said first and second apertures each adapted to receive therethrough a fastener passed through said first cable tray, at least one of said apertures defining a curvilinear length whereby said fastener passed through said first cable tray and disposed within said aperture moves along said curvilinear length as said first cable tray is pivoted upon said first cable tray attachment zone;
    said second cable tray attachment zone including third and fourth apertures through said bed, said third and fourth apertures each adapted to receive therethrough a fastener passed through said second cable tray, at least one of said third and fourth apertures defining a curvilinear length whereby said fastener passed through said second cable tray and disposed within said aperture moves along said curvilinear length as said second cable tray is pivoted upon said second cable tray attachment zone;

wherein the cable tray course redirector further comprises a cable guide positioned along said bed, said cable guide residing between said first tray attachment zone and said second tray attachment zone.

7. The cable tray connector of claim 6, wherein said bed further comprises a plurality of walls extending perpendicularly from portions of the perimeter of said bed, a first wall extending along a length of said bed, a second wall extending along said bed and being angularly disposed to said first wall in a first direction, and a third wall extending along said bed and being angularly disposed to said first wall in a second direction opposite to the first direction, wherein said second wall is disposed from said first wall at a predetermined acute angle and wherein said third wall is disposed from said first wall at an angle supplementary to said predetermined acute angle.

8. The cable tray connector of claim 7, wherein said predetermined acute angle is 45 degrees.

9. The cable tray connector of claim 7, wherein said first cable tray attachment zone is disposed between said first and second walls.

10. The cable tray connector of claim 7, wherein said second cable tray attachment zone is disposed between said first and third walls.

11. The cable tray connector of claim 6, wherein said bed further includes a plurality of apertures positioned along the transverse axis of said connector between said first cable tray attachment zone and said second cable tray attachment zone, said cable guide being attachable to said bed at said apertures.

12. A cable tray system comprising:
(a) a cable tray connector, said cable tray connector comprising
  (i) a bed, said bed having a perimeter and defining a first cable tray attachment zone a second cable tray attachment zone, and a bottom surface,
    said first cable tray attachment zone including first and second apertures through said bottom surface of said bed, said first and second apertures each being sized to receive therethrough a fastener, said first aperture being circular and said second aperture defining a curvilinear length, and
    said second cable tray attachment zone including third and fourth apertures through said bed, said third and fourth apertures each being sized to receive therethrough a fastener, said third aperture being circular and said fourth aperture defining a curvilinear length;
  (ii) first, second, and third walls, said walls extending perpendicularly from portions of the perimeter of said bed;
(b) a first cable tray having a plurality of apertures therethrough, each aperture configured for receipt of a fastener therethrough;
(c) a second cable tray having a plurality of apertures therethrough, each aperture configured for receipt of a fastener therethrough; and
(d) a plurality of fasteners,
  wherein said first cable tray is connected to said first cable tray attachment zone by at least a first and a second fastener,
  said first fastener passing through said first cable tray and said first aperture and
  said second fastener passing through said first cable tray and said second aperture, such that said first cable tray pivots upon said first cable tray attachment zone as the second fastener moves along the curvilinear length of said second aperture; and
  wherein said second cable tray is connected to said second cable tray attachment zone by at least a third and a fourth fastener;
  said third fastener passing through said second cable tray and said third aperture and
  said fourth fastener passing through said second cable tray and said fourth aperture, such that said second cable tray pivots upon said second cable tray attachment zone as the second fastener moves along the curvilinear path of said fourth aperture.

13. The cable tray system of claim 12, wherein said first wall extends along a length of said bed, said second wall extends along said bed and is angularly disposed to said first wall in a first direction, and said third wall extends along said bed and is angularly disposed to said first wall in a second direction opposite to the first direction, wherein said second wall is disposed from said first wall at a predetermined acute angle and wherein said third wall is disposed from said first wall at an angle supplementary to said predetermined acute angle.

14. The cable tray system of claim 13, wherein said predetermined acute angle is approximately 45 degrees.

15. The cable tray system of claim 13, wherein said first cable tray attachment zone is disposed between said first and second walls, and said second cable tray attachment zone is disposed between said first and third walls.

16. The cable tray system of claim 12, further comprising (e) a cable guide positioned along said bed and residing between said first cable tray attachment zone and said second cable tray attachment zone.

17. The cable tray system of claim 16, wherein said bed further includes a plurality of apertures positioned along the transverse axis of said connector between said first cable tray attachment zone and said second cable tray attachment zone, said cable guide being attachable to said bed at said apertures.

18. A cable tray connector, said connector comprising:
a bed, said bed defining a first cable tray attachment zone and a second cable tray attachment zone and a bottom surface, said first cable tray attachment zone being configured for receipt of a first cable tray and said second cable tray attachment zone being configured for receipt of a second cable tray;
said first cable tray attachment zone including first and second apertures through said bottom surface of said bed, said first and second apertures each adapted to receive therethrough a fastener, at least one of said apertures defining a curvilinear length, whereby said fastener passed through said first cable tray and disposed within said aperture moves along said curvilinear length as said first cable tray is moved relative to said first cable tray attachment zone.

19. The cable tray connector of claim 18 wherein the cable tray connector further comprises a cable guide positioned along said bed, said cable guide residing between said first tray attachment zone and said second tray attachment zone.

20. An adjustable cable tray course redirector, said course redirector comprising:
a bed, said bed defining a first cable tray attachment zone and a second cable tray attachment zone and a bottom surface, said first cable tray attachment zone configured for receipt of a first cable tray and said second cable tray attachment zone configured for receipt of a second cable tray;

said first cable tray attachment zone including first and second apertures through said bottom surface of said bed, said first and second apertures each adapted to receive therethrough a fastener passed through said first cable tray, at least one of said apertures defining a curvilinear length whereby said fastener passed through said first cable tray and disposed within said aperture moves along said curvilinear length as said first cable tray is pivoted upon said first cable tray attachment zone;

said second cable tray attachment zone including third and fourth apertures through said bed, said third and fourth apertures each adapted to receive therethrough a fastener passed through said second cable tray, at least one of said third and fourth apertures defining a curvilinear length whereby said fastener passed through said second cable tray and disposed within said aperture moves along said curvilinear length as said second cable tray is pivoted upon said second cable tray attachment zone.

* * * * *